United States Patent
Fattal (10) Patent No.: US 11,531,152 B2
(45) Date of Patent: Dec. 20, 2022

(54) TIME-MULTIPLEXED BACKLIGHT AND MULTIVIEW DISPLAY USING SAME

(71) Applicant: LEIA INC., Menlo Park, CA (US)

(72) Inventor: David A. Fattal, Mountain View, CA (US)

(73) Assignee: LEIA INC., Menlo Park, CA (US)

( * ) Notice: Subject to any disclaimer, the term of this patent is extended or adjusted under 35 U.S.C. 154(b) by 0 days.

(21) Appl. No.: 17/194,300

(22) Filed: Mar. 7, 2021

(65) Prior Publication Data
US 2021/0208328 A1 Jul. 8, 2021

Related U.S. Application Data (63) Continuation of application No. 15/904,404, filed on Feb. 25, 2018, now Pat. No. 10,969,532, which is a
(Continued)

(51) Int. Cl.
*F21V 8/00* (2006.01)
*G02B 1/12* (2006.01)
*G02B 30/24* (2020.01)

(52) U.S. Cl.
CPC ........... *G02B 6/0038* (2013.01); *G02B 1/12* (2013.01); *G02B 6/0023* (2013.01);
(Continued)

(58) Field of Classification Search
CPC ...... G02B 6/0038; G02B 1/12; G02B 6/0023; G02B 6/0031; G02B 6/0035; G02B 6/0058; G02B 6/0068; G02B 30/24; G02B 27/42
See application file for complete search history.

(56) References Cited

U.S. PATENT DOCUMENTS

| 4,755,826 A | 7/1988 | Rao |
| 8,179,362 B2 | 5/2012 | Brigham et al. |

(Continued)

FOREIGN PATENT DOCUMENTS

| CN | 103676448 A | 3/2014 |
| JP | 2008256784 A | 10/2008 |

(Continued)

OTHER PUBLICATIONS

International Search Report (ISR) from the International Searching Authority (ISA/KR) dated Jul. 19, 2016 (3 pages) for counterpart parent PCT Application No. PCT/US2016/025423.
(Continued)

*Primary Examiner* — James M Pontius
(74) *Attorney, Agent, or Firm* — J. Michael Johnson (57) ABSTRACT

Time-multiplexed backlighting includes a time-multiplexed light source to provide a light beam having a first non-zero propagation angle during a first time interval and a second non-zero propagation angle during a second time interval. A time-multiplexed backlight includes a light guide configured to guide the light beam and a diffraction grating configured to coupled out a portion of the guided light beam with a different principal angular direction in each of the first time interval and the second time interval. A multiview display includes the time-multiplexed light source and a multibeam backlight to provide coupled-out light beams during each of the first and second time intervals, wherein the principal angular directions of the coupled-out light beams correspond to different view directions of the multiview display.

15 Claims, 6 Drawing Sheets

Related U.S. Application Data continuation of application No. PCT/US2016/025423, filed on Mar. 31, 2016.

(60) Provisional application No. 62/214,977, filed on Sep. 5, 2015.

(52) U.S. Cl.
CPC ......... *G02B 6/0031* (2013.01); *G02B 6/0035* (2013.01); *G02B 6/0058* (2013.01); *G02B 6/0068* (2013.01); *G02B 30/24* (2020.01)

(56) References Cited

U.S. PATENT DOCUMENTS

| | | |
|---|---|---|
| 8,915,635 B2 | 12/2014 | Fiorentino et al. |
| 9,194,993 B2 | 11/2015 | Fan et al. |
| 2007/0211487 A1 | 9/2007 | Sormani |
| 2010/0060817 A1 | 11/2010 | Park et al. |
| 2011/0228387 A1 | 9/2011 | Shiau et al. |
| 2011/0305014 A1 | 12/2011 | Peck |
| 2012/0008067 A1 | 1/2012 | Mun et al. |
| 2013/0308339 A1 | 11/2013 | Woodgate et al. |
| 2013/0314943 A1 | 11/2013 | Huang |
| 2013/0328866 A1 | 12/2013 | Woodgate et al. |
| 2015/0036068 A1 | 2/2015 | Fattal |
| 2015/0268399 A1 | 9/2015 | Futterer |
| 2016/0033705 A1 | 2/2016 | Fattal |
| 2016/0091648 A1* | 3/2016 | Bang ................. G02B 6/0076 362/606 |

FOREIGN PATENT DOCUMENTS

| | | |
|---|---|---|
| KR | 20100030909 A | 3/2010 |
| TW | 201213731 A | 4/2012 |
| TW | I421596 B | 1/2014 |
| WO | 2014120160 A1 | 7/2014 |
| WO | 2014142851 A1 | 9/2014 |
| WO | 2017039725 A1 | 3/2017 |
| WO | 2017039729 A1 | 3/2017 |

OTHER PUBLICATIONS

Search Report (SR) from the Taiwan Intellectual Property Office (TIPO) date completed Oct. 16, 2017 (1 page English translation and 1 Pg original language document) for foreign counterpart patent application No. 106106830 to counterpart parent PCT application No. PCT/US2016/025423.

Fattal, David et al., "A multi-directional backlight for a wide-angle, glasses-free three-dimensional display," Nature, Mar. 21, 2013, pp. 348-351, vol. 495, Macmillan Publishers Limited, 2013.

\* cited by examiner

TIME-MULTIPLEXED BACKLIGHT AND MULTIVIEW DISPLAY USING SAME

CROSS-REFERENCE TO RELATED APPLICATIONS

This application is a continuation patent application of and claims the benefit of priority to U.S. patent application Ser. No. 15/904,404, filed Feb. 25, 2018, which is a continuation patent application of and claims priority to International Application No. PCT/US2016/025423, filed Mar. 31, 2016, which claims priority to U.S. Provisional Patent Application Ser. No. 62/214,977, filed Sep. 5, 2015, the entire contents of each of which are incorporated herein by reference.

STATEMENT REGARDING FEDERALLY SPONSORED RESEARCH OR DEVELOPMENT

N/A

BACKGROUND

Electronic displays are a nearly ubiquitous medium for communicating information to users of a wide variety of devices and products. Among the most commonly found electronic displays are the cathode ray tube (CRT), plasma display panels (PDP), liquid crystal displays (LCD), electroluminescent displays (EL), organic light emitting diode (OLED) and active matrix OLEDs (AMOLED) displays, electrophoretic displays (EP) and various displays that employ electromechanical or electrofluidic light modulation (e.g., digital micromirror devices, electrowetting displays, etc.). In general, electronic displays may be categorized as either active displays (i.e., displays that emit light) or passive displays (i.e., displays that modulate light provided by another source). Among the most obvious examples of active displays are CRTs, PDPs and OLEDs/AMOLEDs. Displays that are typically classified as passive when considering emitted light are LCDs and EP displays. Passive displays, while often exhibiting attractive performance characteristics including, but not limited to, inherently low power consumption, may find somewhat limited use in many practical applications given the lack of an ability to emit light.

To overcome the limitations of passive displays associated with emitted light, many passive displays are coupled to an external light source. The coupled light source may allow these otherwise passive displays to emit light and function substantially as an active display. Examples of such coupled light sources are backlights. A backlight may serve as a source of light (often a panel backlight) that is placed behind an otherwise passive display to illuminate the passive display. For example, a backlight may be coupled to an LCD or an EP display. The backlight emits light that passes through the LCD or the EP display. The light emitted is modulated by the LCD or the EP display and the modulated light is then emitted, in turn, from the LCD or the EP display. Often backlights are configured to emit white light. Color filters are then used to transform the white light into various colors used in the display. The color filters may be placed at an output of the LCD or the EP display (less common) or between the backlight and the LCD or the EP display, for example.

BRIEF DESCRIPTION OF THE DRAWINGS

Various features of examples and embodiments in accordance with the principles described herein may be more readily understood with reference to the following detailed description taken in conjunction with the accompanying drawings, where like reference numerals designate like structural elements, and in which.

Certain examples and embodiments may have other features that are one of in addition to and in lieu of the features illustrated in the above-referenced figures. These and other features are detailed below with reference to the above-referenced figures.

DETAILED DESCRIPTION

Embodiments in accordance with the principles described herein provide time-multiplexed display backlighting. In particular, backlighting of a display (e.g., an electronic display) employs a time-multiplexed light source to provide a light beam having different angles of propagation during different intervals of time. Light of the light beam may be coupled-out of a backlight as an emitted or coupled-out light beam that is directed in a viewing direction of the display. According to various embodiments, the coupled-out light beam may have a principal angular direction corresponding to or that is determined by the light beam propagation angle. As such, the coupled-out light beam may have different, albeit predetermined, principal angular directions in the different time intervals, according to various embodiments.

Time multiplexing may enable switching between the different principal angular directions as a function of time, for example.

According to some embodiments of the principles described herein, a plurality of coupled-out light beams may be provided by the backlight from the light beam of the time-multiplexed light source. Coupled-out light beams of the plurality may have different principal angular directions from one another. The coupled-out light beams having the different principal angular directions (also referred to as 'the differently directed light beams') may be employed to display information including three-dimensional (3D) or multiview information. In particular, the different principal angular directions of the coupled-out light beam plurality may correspond to various view directions of different views of a 3D or multiview display (e.g., a 'glasses free' or autostereoscopic electronic display). Further, the differently directed coupled-out light beams may be modulated and serve as pixels of the different views of the multiview display.

Moreover, the plurality of coupled-out light beams and different views corresponding thereto provided from the light beam of the time-multiplexed light source may have different directions in different time intervals. In particular, sets of coupled-out light beams of the plurality and corresponding sets of different views provided during the different time intervals according to time multiplexing of the light source may be angularly interleaved with one another, in some embodiments. Angular interleaving of coupled-out light beams and different views of the sets may effectively increase one or both of a pixel resolution and a view resolution of the display, according to various embodiments.

Figure 1A:
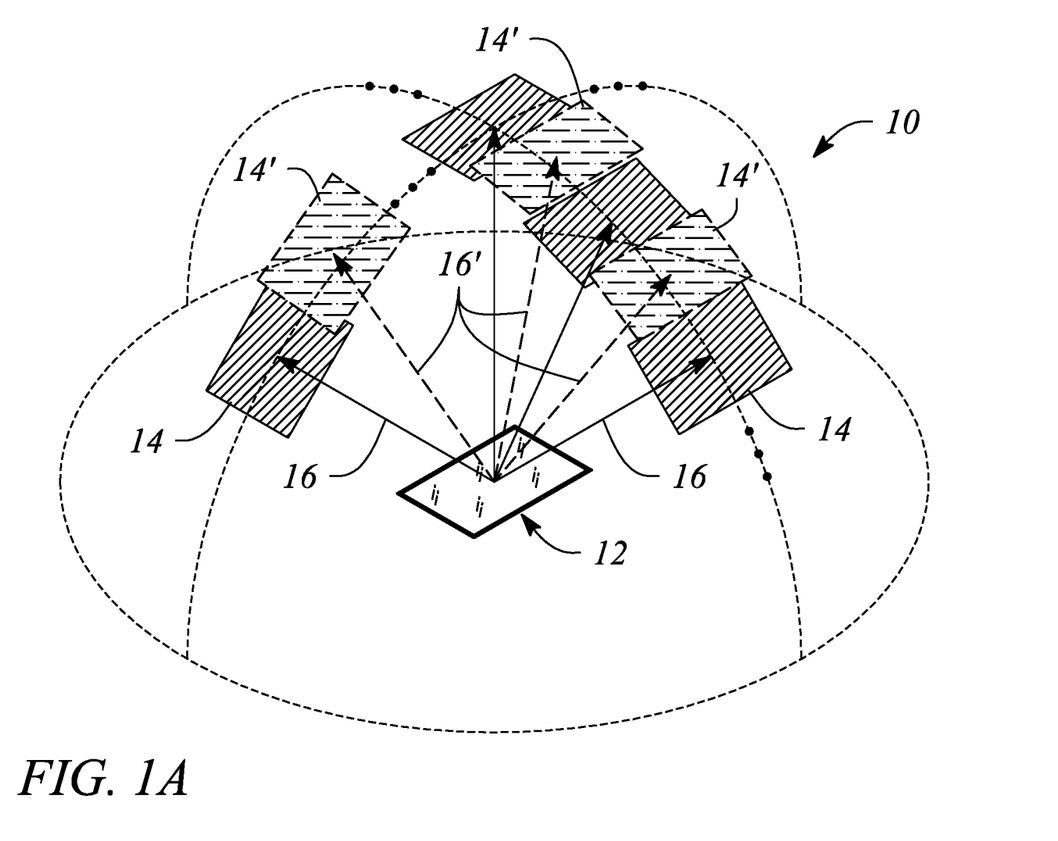
FIG. 1A illustrates a perspective view of a multiview display in an example, according to an embodiment consistent with the principles described herein

Herein, a 3D or multiview display is defined as an electronic display or display system configured to provide different views of a multiview image in different view directions. FIG. 1A illustrates a perspective view of a multiview display 10, according to an example consistent with the principles described herein. As illustrated in FIG. 1A, the multiview display 10 comprises a screen 12 that is viewed in order to see a 3D or multiview image. The multiview display 10 provides different views 14 of the multiview image in different view directions 16 relative to the screen 12. The view directions 16 are illustrated as arrows extending from the screen 12 in various different principal angular directions; the different views 14 are illustrated as shaded polygonal boxes at the termination of the arrows (i.e., depicting the view directions 16); and only four views 14 and four view directions 16 are illustrated, all by way of example and not limitation. Note that while the different views 14 are illustrated in FIG. 1A as being above the screen, the views 14 actually appear on or in a vicinity of the screen 12 when the multiview image is displayed on the multiview display 10. Depicting the views 14 above the screen 12 is only for simplicity of illustration meant to represent viewing the multiview display 10 from a respective one of the view directions 16 corresponding to a particular view 14.

Figure 1B:
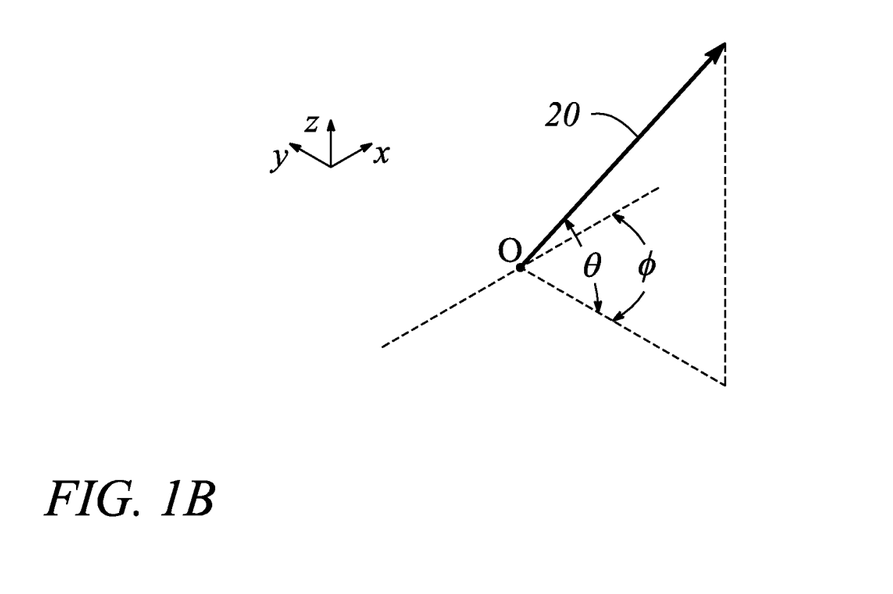
FIG. 1B illustrates a graphical representation of the angular components of a light beam having a particular principal angular direction corresponding to a view direction of a multiview display in an example, according to an embodiment consistent with the principles described herein.

A view direction or equivalently a light beam having a direction corresponding to a view direction of a multiview display generally has a principal angular direction given by angular components $\{\theta, \phi\}$, by definition herein. The angular component B is referred to herein as the 'elevation component' or 'elevation angle' of the light beam. The angular component $\phi$ is referred to as the 'azimuth component' or 'azimuth angle' of the light beam. By definition, the elevation angle $\theta$ is an angle in a vertical plane (e.g., perpendicular to a plane of the multiview display screen while the azimuth angle $\phi$ is an angle in a horizontal plane (e.g., parallel to the multiview display screen plane). FIG. 1B illustrates a graphical representation of the angular components $\{\theta, \phi\}$ of a light beam 20 having a particular principal angular direction corresponding to a view direction of a multiview display, according to an example of the principles described herein. In addition, the light beam 20 is emitted or emanates from a particular point, by definition herein. That is, by definition, the light beam 20 has a central ray associated with a particular point of origin within the multiview display. FIG. 1B also illustrates the light beam (or view direction) point of origin O.

Referring again to FIG. 1A, also illustrated are other views 14' (e.g., a second set of views) with corresponding view directions 16'. The other views 14' are polygonal boxes shaded with dashed-dot shading at the end of the dashed-line corresponding view direction 16' arrows to further distinguish from the first mentioned views 14. The other views 14' may be views of the multiview display provided during a second time interval, while the views 14 (e.g., a first set of views) may be views of multiview display provided during a first time interval, for example. Further, as illustrated, the other views 14' and the other view directions 16' are angularly interleaved with the views 14 and the corresponding view directions 16. Note that in FIG. 1A, solid lines illustrating the views 14 and the view directions 16 represent these elements during the first time interval, while dashed lines of the other views 14' and the other view directions 16' represent these elements during the second time interval. Note that while reference is made herein to a 'first' time interval and a 'second' time interval, in general any number of time intervals may be used. As such, there may also be a third time interval, a fourth time interval and so on. Herein, reference is confined to 'first' and 'second' for ease of discussion and not by way of limitation.

Herein, 'multiview' as used in the terms 'multiview image' and 'multiview display' is defined as a plurality of views representing different perspectives or including angular disparity between views of the view plurality. Further, the term 'multiview' by definition explicitly includes more than two different views (i.e., a minimum of three views and generally more than three views). As such, 'multiview' as employed herein is explicitly distinguished from stereoscopic views that include only two different views to represent a scene. Note however, while multiview images and multiview displays include more than two views, by definition herein, multiview images may be viewed (e.g., on a multiview display) as a stereoscopic pair of images by selecting only two of the multiview views to view at a time (e.g., one view per eye).

Herein, a 'light guide' is defined as a structure that guides light within the structure using total internal reflection. In particular, the light guide may include a core that is substantially transparent at an operational wavelength of the light guide. In various examples, the term 'light guide' generally refers to a dielectric optical waveguide that employs total internal reflection to guide light at an interface between a dielectric material of the light guide and a material or medium that surrounds that light guide. By definition, a condition for total internal reflection is that a refractive index of the light guide is greater than a refractive index of a surrounding medium adjacent to a surface of the light guide material. In some embodiments, the light guide may include a coating in addition to or instead of the aforementioned refractive index difference to further facilitate the total internal reflection. The coating may be a reflective coating, for example. The light guide may be any of several light guides including, but not limited to, one or both of a plate or slab guide and a strip guide.

Further herein, the term 'plate' when applied to a light guide as in a 'plate light guide' is defined as a piece-wise or differentially planar layer or sheet, which is sometimes referred to as a 'slab' guide. In particular, a plate light guide is defined as a light guide configured to guide light in two substantially orthogonal directions bounded by a top surface and a bottom surface (i.e., opposite surfaces) of the light guide. Further, by definition herein, the top and bottom surfaces are both separated from one another and may be substantially parallel to one another in at least a differential sense. That is, within any differentially small section of the plate light guide, the top and bottom surfaces are substantially parallel or co-planar.

In some embodiments, the plate light guide may be substantially flat (i.e., confined to a plane) and therefore, the plate light guide is a planar light guide. In other embodiments, the plate light guide may be curved in one or two orthogonal dimensions. For example, the plate light guide may be curved in a single dimension to form a cylindrical shaped plate light guide. However, any curvature has a radius of curvature sufficiently large to insure that total internal reflection is maintained within the plate light guide to guide light.

Herein, a 'diffraction grating' is generally defined as a plurality of features (i.e., diffractive features) arranged to provide diffraction of light incident on the diffraction grating. In some examples, the plurality of features may be arranged in a periodic or quasi-periodic manner. For example, the diffraction grating may include a plurality of features (e.g., a plurality of grooves or ridges in a material surface) arranged in a one-dimensional (1D) array. In other examples, the diffraction grating may be a two-dimensional (2D) array of features. The diffraction grating may be a 2D array of bumps on or holes in a material surface, for example.

As such, and by definition herein, the 'diffraction grating' is a structure that provides diffraction of light incident on the diffraction grating. If the light is incident on the diffraction grating from a light guide, the provided diffraction or diffractive scattering may result in, and thus be referred to as, 'diffractive coupling' in that the diffraction grating may couple light out of the light guide by diffraction. The diffraction grating also redirects or changes an angle of the light by diffraction (i.e., at a diffractive angle). In particular, as a result of diffraction, light leaving the diffraction grating generally has a different propagation direction than a propagation direction of the light incident on the diffraction grating (i.e., incident light). The change in the propagation direction of the light by diffraction is referred to as 'diffractive redirection' herein. Hence, the diffraction grating may be understood to be a structure including diffractive features that diffractively redirects light incident on the diffraction grating and, if the light is incident from a light guide, the diffraction grating may also diffractively couple out the light from the light guide.

Further, by definition herein, the features of a diffraction grating are referred to as 'diffractive features' and may be one or more of at, in and on a material surface (i.e., a boundary between two materials). The surface may be a surface of a light guide, for example. The diffractive features may include any of a variety of structures that diffract light including, but not limited to, one or more of grooves, ridges, holes and bumps at, in or on the surface. For example, the diffraction grating may include a plurality of substantially parallel grooves in the material surface. In another example, the diffraction grating may include a plurality of parallel ridges rising out of the material surface. The diffractive features (e.g., grooves, ridges, holes, bumps, etc.) may have any of a variety of cross sectional shapes or profiles that provide diffraction including, but not limited to, one or more of a sinusoidal profile, a rectangular profile (e.g., a binary diffraction grating), a triangular profile and a saw tooth profile (e.g., a blazed grating).

By definition herein, a 'multibeam diffraction grating' is a diffraction grating that produces diffractively redirected light (e.g., diffractively coupled-out light) that includes a plurality of light beams. The light beams of the plurality produced by a multibeam diffraction grating have different principal angular directions from one another, by definition herein. In particular, by definition, a light beam of the plurality has a predetermined principal angular direction that is different from another light beam of the light beam plurality as a result of diffractive coupling and diffractive redirection of incident light by the multibeam diffraction grating. The light beam plurality may represent a light field. For example, the light beam plurality may include eight light beams that have eight different principal angular directions. The eight light beams in combination (i.e., the light beam plurality) may represent the light field, for example. According to various embodiments, the different principal angular directions of the various light beams are determined by a combination of a grating pitch or spacing and an orientation or rotation of the diffractive features of the multibeam diffraction grating at points of origin of the respective light beams relative to a propagation direction or angle of the light incident on the multibeam diffraction grating.

According to various embodiments described herein, a diffraction grating (e.g., a multibeam diffraction grating) is employed to produce coupled-out light that represents pixels of an electronic display or simply a 'display.' In particular, the light guide having a multibeam diffraction grating to produce the light beams of the plurality having different principal angular directions may be part of a backlight of or used in conjunction with a display such as, but not limited to, a 'glasses free' multiview display (also sometimes referred to as a 'holographic' display or an autostereoscopic display). As such, the differently directed light beams produced by coupling out guided light from the light guide using the multibeam diffractive grating may be or represent 'pixels' of the multiview display. Moreover, as described above, the differently directed light beams may form a light field including directions corresponding to view directions of the multiview display.

According to various examples described herein, a diffraction grating (e.g., a multibeam diffraction grating) may be employed to diffractively scatter or couple light out of a light guide (e.g., a plate light guide) as a light beam. In particular, a diffraction angle $\theta_m$ of or provided by a locally periodic diffraction grating may be given by equation (1) as:

$$\theta_m = \sin^{-1}\left(n \sin\theta_i - \frac{m\lambda}{d}\right) \quad (1)$$

where $\lambda$ is a wavelength of the light, m is a diffraction order, n is an index of refraction of a light guide, d is a distance between features of the diffraction grating, $\theta_i$ is an angle of incidence of light on the diffraction grating. For simplicity, equation (1) assumes that the diffraction grating is adjacent to a surface of the light guide and a refractive index of a material outside of the light guide is equal to one (i.e., $n_{out}=1$). In general, the diffraction order m is given by an integer. According to various examples, a diffraction angle of a light beam produced by the diffraction grating may be given by equation (1) where the diffraction order is positive (e.g., m>0). For example, first-order diffraction is provided when the diffraction order m is equal to one (i.e., m=1).

Figure 2:
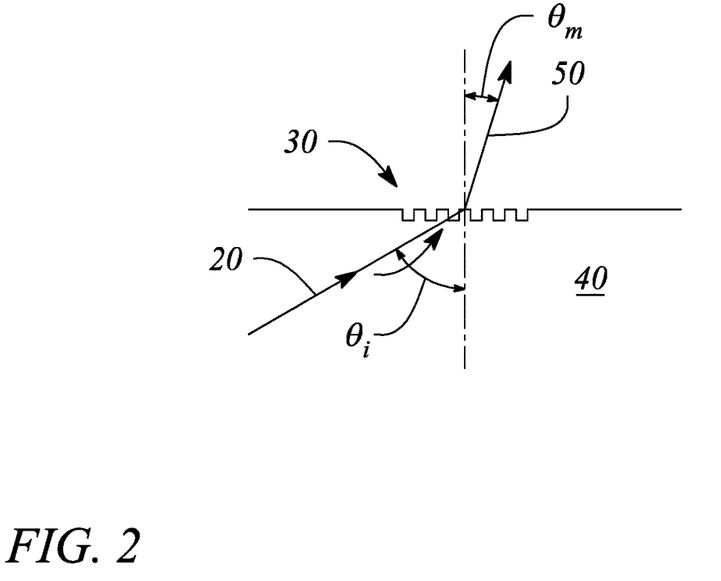
FIG. 2 illustrates a cross sectional view of a diffraction grating in an example, according to an embodiment consistent with the principles described herein.

FIG. 2 illustrates a cross sectional view of a diffraction grating 30 in an example, according to an embodiment consistent with the principles described herein. For example, the diffraction grating 30 may be located on a surface of a light guide 40. In addition, FIG. 2 illustrates a light beam 20 incident on the diffraction grating 30 at an incident angle $\theta_i$. The light beam 20 is a guided time-multiplexed light beam within the light guide 40. Also illustrated in FIG. 2 is a coupled-out light beam 50 diffractively produced and coupled-out by the diffraction grating 30 as a result of the incident light beam 20. The coupled-out light beam 50 has a diffraction angle $\theta_m$ (or principal angular direction) as given by equation (1). The coupled-out light beam 50 may correspond to a diffraction order 'm' of the diffraction grating 30, for example.

Herein a 'collimator' is defined as substantially any optical device or apparatus that is configured to collimate light. For example, a collimator may include, but is not limited to, a collimating mirror or reflector, a collimating lens, and various combinations thereof. In some embodiments, the collimator comprising a collimating reflector may have a reflecting surface characterized by a parabolic curve or shape. In another example, the collimating reflector may comprise a shaped parabolic reflector. By 'shaped parabolic' it is meant that a curved reflecting surface of the shaped parabolic reflector deviates from a 'true' parabolic curve in a manner determined to achieve a predetermined reflection characteristic (e.g., a degree of collimation). Similarly, a collimating lens may comprise a spherically shaped surface (e.g., a biconvex spherical lens).

In some embodiments, the collimator may be a continuous reflector or a continuous lens (i.e., a reflector or a lens having a substantially smooth, continuous surface). In other embodiments, the collimating reflector or the collimating lens may comprise a substantially discontinuous surface such as, but not limited to, a Fresnel reflector or a Fresnel lens that provides light collimation. According to various embodiments, an amount of collimation provided by the collimator may vary in a predetermined degree or amount from one embodiment to another. Further, the collimator may be configured to provide collimation in one or both of two orthogonal directions (e.g., a vertical direction and a horizontal direction). That is, the collimator may include a shape or shaped surface in one or both of two orthogonal directions that provides light collimation, according to some embodiments.

Herein, a 'light source' is defined as a source of light (e.g., an optical emitter configured to produce and emit light). For example, the light source may comprise an optical emitter such as a light emitting diode (LED) that emits light when activated or turned on. In particular, herein the light source may be substantially any source of light or comprise substantially any optical emitter including, but not limited to, one or more of a light emitting diode (LED), a laser, an organic light emitting diode (OLED), a polymer light emitting diode, a plasma-based optical emitter, a fluorescent lamp, an incandescent lamp, and virtually any other source of light. The light produced by the light source may have a color (i.e., may include a particular wavelength of light), or may be a range of wavelengths (e.g., white light). In some embodiments, the light source may comprise a plurality of optical emitters. For example, the light source may include a set or group of optical emitters in which at least one of the optical emitters produces light having a color, or equivalently a wavelength, that differs from a color or wavelength of light produced by at least one other optical emitter of the set or group. The different colors may include primary colors (e.g., red, green, blue) for example.

Further, as used herein, the article 'a' is intended to have its ordinary meaning in the patent arts, namely 'one or more'. For example, 'a grating' means one or more gratings and as such, 'the grating' means 'the grating(s)' herein. Also, any reference herein to 'top', 'bottom', 'upper', 'lower', 'up', 'down', 'front', back', 'first', 'second', 'left' or 'right' is not intended to be a limitation herein. Herein, the term 'about' when applied to a value generally means within the tolerance range of equipment used to produce the value, or may mean plus or minus 10%, or plus or minus 5%, or plus or minus 1%, unless otherwise expressly specified. Further, the term 'substantially' as used herein means a majority, or almost all, or all, or an amount within a range of about 51% to about 100%. Moreover, examples herein are intended to be illustrative only and are presented for discussion purposes and not by way of limitation.

Figure 3A:
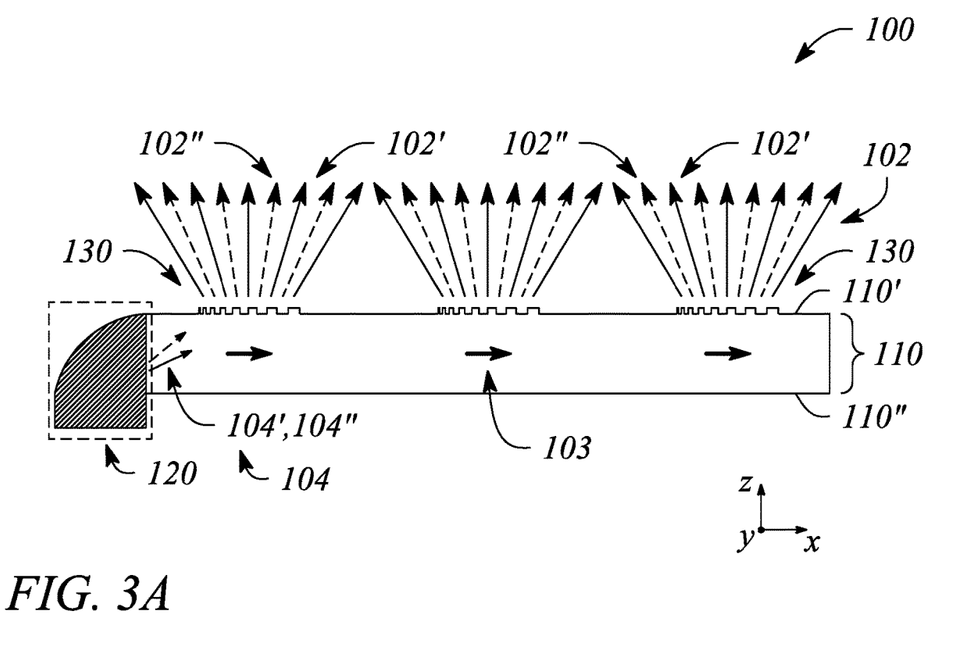
FIG. 3A illustrates a cross sectional view of a time-multiplexed backlight in an example, according to an embodiment consistent with the principles described herein.
Figure 3B:
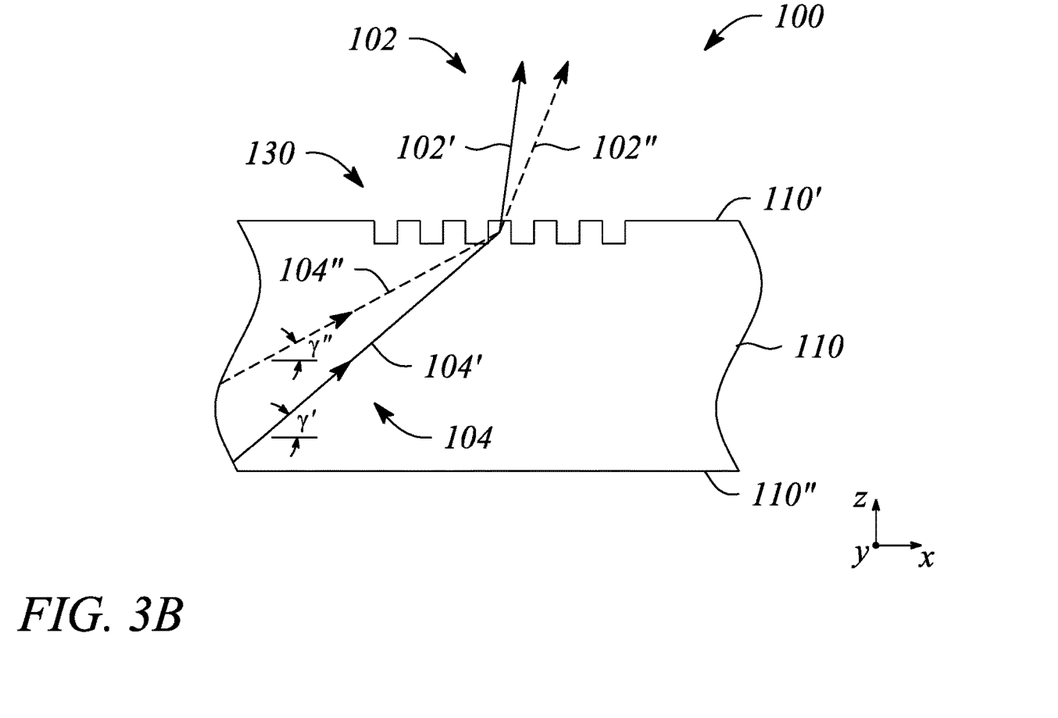
FIG. 3B illustrates a cross sectional view of a portion of a time-multiplexed backlight in an example, according to another embodiment consistent with the principles described herein.
Figure 3C:
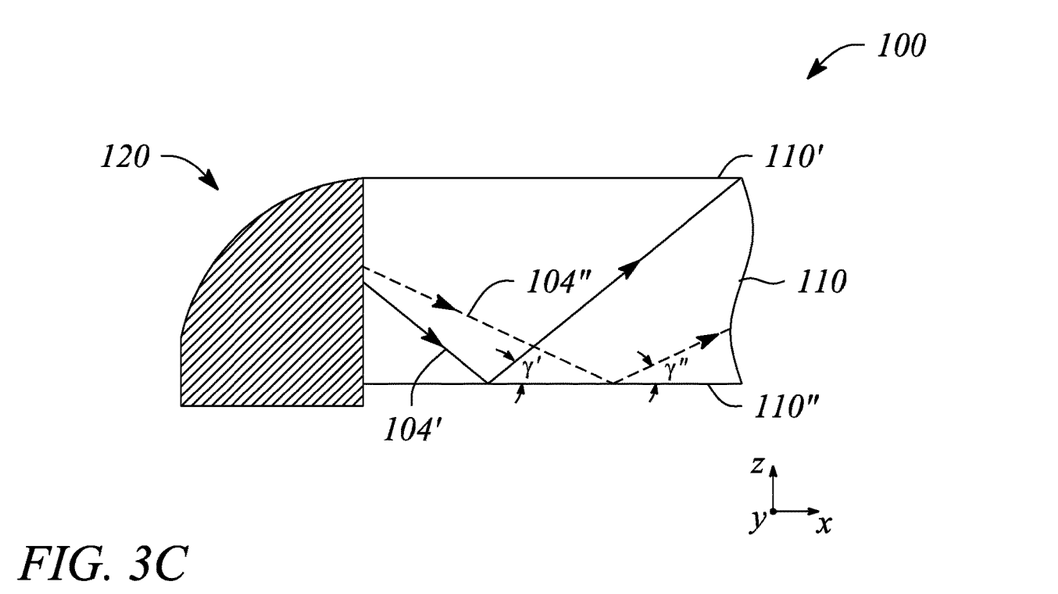
FIG. 3C illustrates a cross sectional view of another portion of a time-multiplexed backlight in an example, according to another embodiment consistent with the principles described herein.

In accordance with some embodiments of the principles described herein, a time-multiplexed backlight is provided. FIG. 3A illustrates a cross sectional view of a time-multiplexed backlight 100 in an example, according to an embodiment consistent with the principles described herein. FIG. 3B illustrates a cross sectional view of a portion of a time-multiplexed backlight 100 in an example, according to another embodiment consistent with the principles described herein. FIG. 3C illustrates a cross sectional view of another portion of a time-multiplexed backlight 100 in an example, according to another embodiment consistent with the principles described herein.

According to various embodiments, light coupled out from the time-multiplexed backlight 100 may form or provide an emitted or 'coupled-out' light beam 102 directed away from a surface of the time-multiplexed backlight 100. Moreover, the coupled-out light beam 102 may be directed away from the surface in different principal angular directions during different time intervals. For example, the coupled-out light beam 102 may be time-multiplexed to have a first principal angular direction in or during a first time interval and a second principal angular direction during a second time interval. In particular, the principal angular direction of the coupled-out light beam 102 is time-multiplexed, according to various embodiments.

FIGS. 3A and 3B depicts the coupled-out light beam 102 during a first time interval using a solid arrow, while a dashed arrow depicts the coupled-out light beam 102 during a second time interval. In particular, FIG. 3A illustrates a plurality of coupled-out light beams 102, where the coupled-out light beams 102 in the first time interval are angularly interleaved with the coupled-out light beams 102 in the second time interval. FIG. 3B illustrates a single coupled-out light beam 102 having a different principal angular direction in each of the first time interval and the second time interval.

Note that while specific reference is made above to a 'first' non-time interval and a 'second' time interval, in general there may be a plurality of time intervals and corresponding different coupled-out light beams 102 in different time intervals of the plurality. As such, for example, there may also be a third time interval, a fourth time interval and so on with corresponding coupled-out light beams 102. Herein, reference is confined to 'first' and 'second' for ease of discussion and not by way of limitation.

In some embodiments (as described below), the time-multiplexed backlight 100 may be a grating-based backlight. For example, diffraction may provide diffractive coupling of light out of the time-multiplexed backlight 100. That is, a diffraction grating may be employed to couple out the light as the coupled-out light beam 102. In other embodiments, the light may be coupled or scattered out as the coupled-out light beam 102 in another manner including, but not limited to, reflective scattering.

Moreover, the principal angular directions of coupled-out light beams 102 of the plurality may be time-multiplexed (i.e., may differ in different time intervals). In particular, in some embodiments described in more detail below with respect to the time-multiplexed backlight 100 configured as a multibeam backlight and more specifically with respect to a multibeam diffraction grating, the plurality of coupled-out light beams 102 may be configured to form a light field. According to various embodiments, the light field may have different characteristics or different angular components during different time intervals as a function of or as provided by time multiplexing. For example, different sets of coupled-out light beams 102 having corresponding different sets of principal angular directions may be provided in different time intervals by the time-multiplexed backlight 100, as a result of time multiplexing.

According to various embodiments, the coupled-out light of the coupled-out light beam 102 includes a portion of light within the time-multiplexed backlight 100. In particular, the light may be guided light or equivalently a guided light beam 104 within the time-multiplexed backlight 100 (e.g., in a light guide, as described below). As illustrated in FIGS. 3A-3C, a general propagation direction of the guided light beam 104 is illustrated as horizontal bold arrows 103 for simplicity of illustration and not by way of limitation. Further, time multiplexing of the principal angular direction of the coupled-out light beam 102 may be provided through time multiplexing of a non-zero propagation angle of the guided light beam 104, as is described below in more detail.

In some embodiments, the time-multiplexed backlight 100 may be a source of light or a 'backlight' of a display (e.g., an electronic display). In particular, according to some embodiments where a light field is produced by the plurality of coupled-out light beams 102, the electronic display may be a so-called 'glasses free' multiview electronic display (e.g., a 3D display or autostereoscopic display) in which the various coupled-out light beams 102 correspond to or represent pixels associated with different 'views' of the multi-view display. Further, in some embodiments, the coupled-out light beams 102 may be modulated (e.g., by a light valve, as described below). For example, a light valve may be employed to modulate the coupled-out light beam 102. Modulation of different sets of coupled-out light beams 102 directed in different angular directions away from the time-multiplexed backlight 100 may be particularly useful for dynamic multiview electronic display applications. That is, the different sets of modulated coupled-out light beams 102 directed in particular view directions may represent dynamic pixels of the multiview electronic display corresponding to the particular view directions thereof.

The time-multiplexed backlight 100 illustrated in FIGS. 3A-3C comprises a light guide 110. In some embodiments, the light guide 110 may be a plate light guide. The light guide 110 is configured to guide light as a guided beam of light (i.e., a guided light beam 104). For example, the light guide 110 may include a dielectric material configured as an optical waveguide. The dielectric material may have a first refractive index that is greater than a second refractive index of a medium surrounding the dielectric optical waveguide. The difference in refractive indices is configured to facilitate total internal reflection of the guided light according to one or more guided modes of the light guide 110, for example. In some embodiments, the guided light beam 104 may be collimated (i.e., a collimated guided light beam 104).

According to various embodiments, the guided light beam 104 is guided by and along a length of the light guide 110 (e.g., the general direction as illustrated by the bold arrows 103 in FIG. 3A). Further, the light guide 110 is configured to guide the guided light beam 104 at a non-zero propagation angle between a first surface 110' (e.g., 'front' surface or side) and a second surface 110" (e.g., 'back' surface or side) of the light guide 110 using total internal reflection. In particular, the guided light beam 104 propagates by reflecting or 'bouncing' between the first surface 110' and the second surface 110" of the light guide 110 at the non-zero propagation angle.

As defined herein, a 'non-zero propagation angle' is an angle relative to a surface (e.g., the first surface 110' or the second surface 110") of the light guide 110. Further, when referring to light (e.g., the guided light beam 104) guided by the light guide 110, the non-zero propagation angle is, by definition herein, both greater than zero and less than a critical angle of total internal reflection within the light guide 110. Moreover, a specific non-zero propagation angle may be chosen (e.g., arbitrarily) for a particular implementation as long as the specific non-zero propagation angle is chosen to be less than the critical angle of total internal reflection within the light guide 110.

In some examples, the light guide 110 (e.g., as a plate light guide) may be a slab or plate optical waveguide comprising an extended, substantially planar sheet of optically transparent, dielectric material. The substantially planar sheet of dielectric material is configured to guide the guided light beam 104 using total internal reflection. According to various examples, the optically transparent material of the light guide 110 may include or be made up of any of a variety of dielectric materials including, but not limited to, one or more of various types of glass (e.g., silica glass, alkali-aluminosilicate glass, borosilicate glass, etc.) and substantially optically transparent plastics or polymers (e.g., poly(methyl methacrylate) or 'acrylic glass', polycarbonate, etc.). In some examples, the light guide 110 may further include a cladding layer (not illustrated) on at least a portion of a surface (e.g., one or both of the top surface and the bottom surface) of the light guide 110. The cladding layer may be used to further facilitate total internal reflection, according to some embodiments.

According to various embodiments, light of the guided light beam 104 in the light guide 110 may be introduced or coupled into the light guide 110 at the non-zero propagation angle. One or more of a lens, a mirror or similar reflector (e.g., a tilted collimating reflector), and a prism (not illustrated) may facilitate coupling light into an input end of the light guide 110 as the guided light beam 104 at the non-zero propagation angle, for example. Once coupled into the light guide 110, the guided light beam 104 propagates along the light guide 110 in a direction that is generally away from the input end (e.g., illustrated by bold arrows 103 pointing along an x-axis in FIGS. 3A-3C).

Further, the guided light beam 104 produced by coupling light into the light guide 110 may be a collimated light beam, according to various embodiments. Herein, a 'collimated light' or 'collimated light beam' is defined as a beam of light in which rays of the light beam are substantially parallel to one another within the light beam (e.g., the guided light beam 104). Further, rays of light that diverge or are scattered from the collimated light beam are not considered to be part of the collimated light beam, by definition herein. Collimation of the light to produce the collimated guided light beam 104 may be provided by a collimator including, but not limited to, the lens or mirror (e.g., tilted collimating reflector, etc.).

As illustrated in FIGS. 3A and 3C, the time-multiplexed backlight 100 further comprises a time-multiplexed light source 120. The time-multiplexed light source 120 is configured to provide light as a light beam to the light guide 110. For example, the time-multiplexed light source 120 may be optically coupled to an input end of the light guide 110 such that the provided light is communicated to the light guide 110 through the input end. Further, the time-multiplexed light source 120 is configured to provide the light to the light guide 110 as the guided light beam 104 (respective light beams 104' and 104") at a first non-zero propagation angle during a first time interval and at a second non-zero propagation angle during a second time interval, wherein the first non-zero propagation angle and the second non-zero propagation angle are different from one another.

Note that while specific reference is made herein to a 'first' non-zero propagation angle and a 'second' non-zero propagation angle corresponding to the first and second time intervals, respectively, in general there may a plurality of different non-zero propagation angles. In particular, the time-multiplexed light source 120 may be configured to provide the guided light beam 104 at different non-zero propagation angles of the plurality corresponding to respective different time intervals of the plurality of time intervals.

In particular, in FIG. 3C, the guided light beam 104' provided by the time-multiplexed light source 120 during the first time interval is illustrated using a solid extended arrow. Similarly, the guided light beam 104" provided by the time-multiplexed light source 120 during the second time interval is depicted by a dashed extended arrow. Further, FIGS. 3B-3C illustrate the first non-zero propagation angle $\gamma'$ and the second non-zero propagation angle $\lambda$ "of the guided light beams 104', 104" provided respectively in each of the first and second time intervals by the time-multiplexed light source 120.

In some embodiments, the first and second time intervals may be non-overlapping intervals of time. That is, the respective guided light beam 104 may have at any point in time either, but not both, of the first non-zero propagation angle or the second non-zero propagation angle. In other embodiments, the first and second time intervals may overlap such that both propagation angles exist simultaneously within the light guide 110 for a period of time corresponding to the overlap in time intervals. Note that FIG. 3B illustrates the guided light beam 104', 104" having both the first non-zero propagation angle $\lambda'$ and the second non-zero propagation angle $\lambda''$ simultaneously incident on the diffraction grating 130, for simplicity of illustration not by way of limitation.

The time-multiplexed light source 120 may be realized using any of variety of different configurations, according to various embodiments. For example, the time-multiplexed light source 120 may include a plurality of optical emitters having locations or positions configured to provide light at different angles to the light guide 110. Selectively switching the optical emitters of the plurality on and off may provide time multiplexing of the non-zero propagation angle of the guided light beam, according to some embodiments. In other examples, an optical element of the time-multiplexed light source 120 such as, but not limited to, a tilted reflector or a collimator (e.g., collimating reflector or collimating lens) may be configured to selectively change an angle of light from an optical emitter as a function of time in order to effect time multiplexing of the non-zero propagation angle. In yet other examples, the time-multiplexed light source 120 may include an optical emitter that is selectively movable or that may be selectively tilted to provide the different angles of light at an input of the light guide 110. For example, a mounting structure of the optical emitter may be mechanically shifted or moved relative to the input end of the light guide 110. In another example, the optical emitter may be gimbal-mounted allowing selective tilting of the optical emitter to provide time multiplexing of the non-zero propagation angle of the guided light beam 104.

Figure 4A:
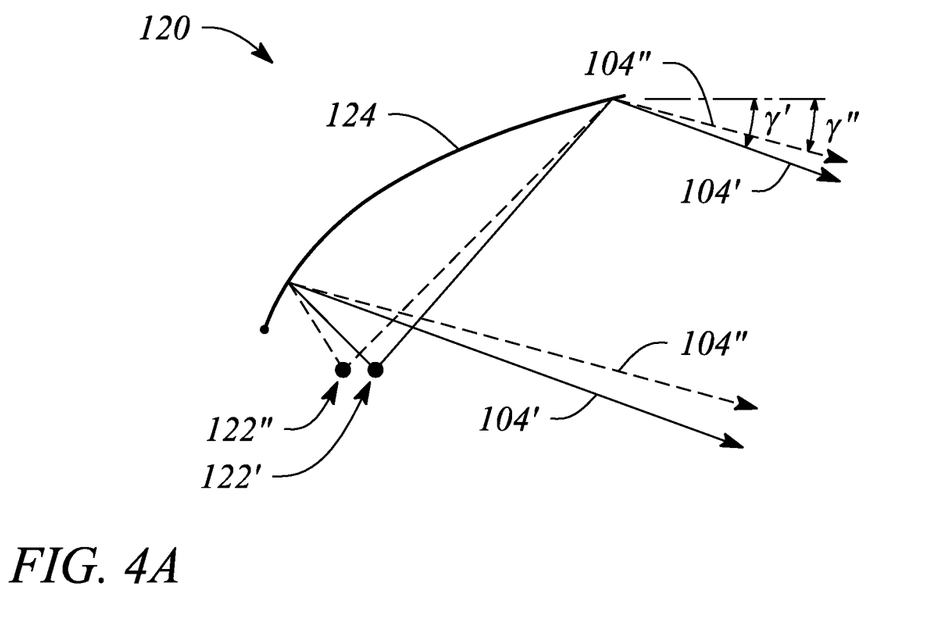
FIG. 4A illustrates a schematic view of a time-multiplexed light source in an example, according to an embodiment consistent with the principles described herein.

FIG. 4A illustrates a time-multiplexed light source 120 in an example, according to an embodiment consistent with the principles described herein. As illustrated in FIG. 4A, the time-multiplexed light source 120 comprises a pair of time-multiplexed optical emitters 122', 122". A first optical emitter 122' of the pair is configured to provide the guided light beam 104' at the first non-zero propagation angle and a second optical emitter 122" of the pair is configured to provide the guided light beam 104" at the second non-zero propagation angle. The different propagation angles of the guided light beam 104', 104" may result from a difference in a relative location of the first and second optical emitters 122', 122" relative to a tilted reflector 124, as illustrated for example. The tilted reflector 124 may be a tilted collimating reflector, for example. Switching between (i.e., selective turning on and off) the first optical emitter 122' and the second optical emitter 122" as a function of time may be configured to provide the guided light beam 104', 104" during respective first and second time intervals, according to various embodiments. As illustrated in FIG. 4A, a solid line represents the guided light beam 104' during the first time interval from the first optical emitter 122', while a dashed line represents the guided light beam 104" during the second time interval from the second optical emitter 122", by way of example.

In some embodiments, the optical emitter 122 of the time-multiplexed light source 120 may include, but is not limited to, a light emitting diode (LED) and a laser. For example, the first and second optical emitters 122', 122" may include an LED of a particular color (e.g., red, green, blue) to provide monochromatic light. In some embodiments, an optical emitter 122 of the pair may comprise a plurality of optical emitters configured to provide a plurality of different colors of light. For example, the optical emitter 122 may comprise a first LED configured to provide red light, a second LED configured to provide green light, and a third LED configured to provide blue light. According to some embodiments in which different colors of light are provided by the optical emitters 122 of the time-multiplexed light source 120, the light guide 110 may be further configured to guide light beams representing the different colors of light at different color-specific, non-zero propagation angles (e.g., in addition to the first and second non-zero propagation angles associated with the time multiplexing). For example, when the time-multiplexed light source 120 is configured to provide red light, green light and blue light, each of the red light, the green light and the blue light may be provided as a different color, collimated light beam. Further, the light guide 110 may be configured to guide each of the different color collimated light beams at a respective different color-specific, non-zero propagation angle. In other embodiments, the time-multiplexed light source 120 may be a broadband light source such as, but not limited to, a fluorescent light and a white LED or more generally a polychromatic LED configured to provide broadband light (e.g., white or polychromatic light).

Figure 4B:
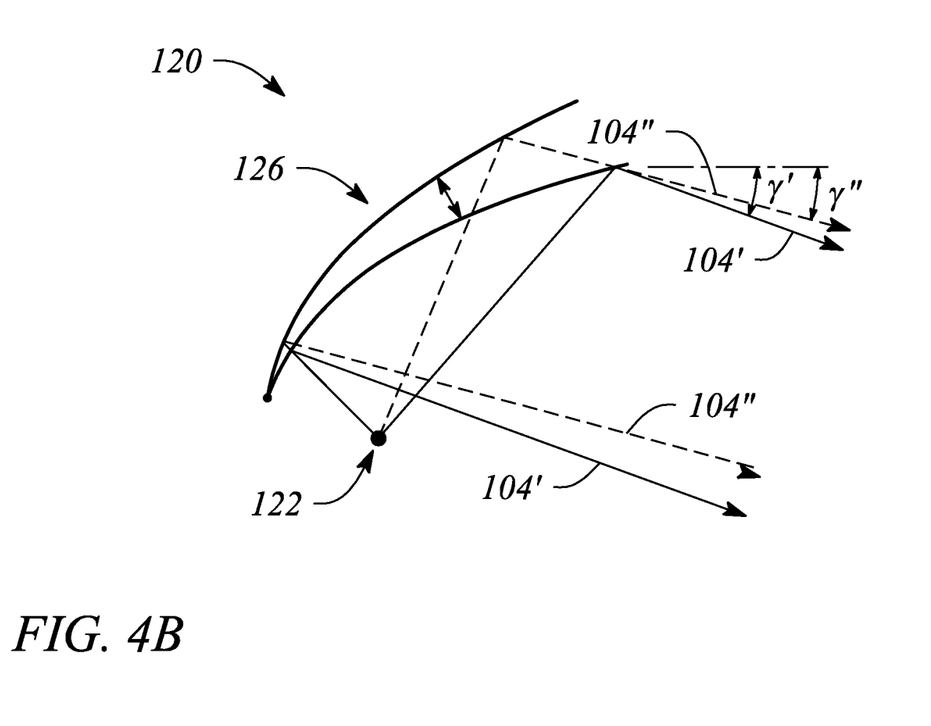
FIG. 4B illustrates a schematic view of a time-multiplexed light source in an example, according to another embodiment consistent with the principals described herein.

FIG. 4B illustrates a time-multiplexed light source 120 in an example, according to another embodiment consistent with the principals described herein. In particular, as illustrated in FIG. 4B, the time-multiplexed light source 120 comprises the optical emitter 122 configured to emit light. The time-multiplexed light source 120 of FIG. 4B further comprises a time-multiplexed collimator 126. The time-multiplexed collimator 126 is configured to collimate the emitted light and to provide the collimated emitted light as the guided light beam 104. According to various embodiments, the time-multiplexed collimator 126 has a first collimation state configured to provide the collimated emitted light at the first non-zero propagation angle during the first time interval. Further, the time-multiplexed collimator 126 has a second collimation state configured to provide the collimated emitted light at the second non-zero propagation angle during the second time interval. The first and second collimation states may be provided by mechanical motion of the time-multiplexed collimator 126, according to some embodiments. For example, the time-multiplexed collimator 126 may comprise a tilted collimating reflector (e.g., as illustrated in FIG. 4B) having a tilt angle that is variable to provide first and second collimation states.

Referring again to FIGS. 3A and 3B, the time-multiplexed backlight 100 further comprises a diffraction grating 130. The diffraction grating 130 may be a member of a plurality or array of diffraction gratings 130 spaced apart from one another in the direction of propagation (bold arrows 103) of the guided light beam 104, e.g., as illustrated in FIG. 3A. The diffraction grating 130 is configured to diffractively couple out a portion of the guided light beam 104 as a coupled-out light beam 102. According to various embodiments, the coupled-out light beam 102 has a different principal angular direction in each of the first time interval and the second time interval. Moreover, the time interval-based different principal angular directions of the coupled-out light beam 102 in the first time interval and the second time interval correspond to respective ones of the first non-zero propagation angle and the second non-zero propagation angle of the guided light beam 104, e.g., according to equation (1) above.

Further, the diffraction grating 130 (or diffraction gratings 130 of the plurality) is optically coupled to the light guide 110. In particular, by definition, the diffraction grating 130 is located within an optical field of the guided light beam 104 within the light guide 110 to enable diffractive coupling out of the guided light beam portion. According to some embodiments, the diffraction grating 130 may be located at (e.g., on, in or otherwise adjacent to) a surface of the light guide 110. At the surface, the diffraction grating 130 is within an evanescent portion of the optical field of the guided light beam 104 enabling diffractive coupling out. For example, the diffraction grating 130 may be located on the first surface 110' of the light guide 110, as illustrated in FIG. 3A. In another example (not illustrated), the diffraction grating 130 may be adjacent to the second surface 110" of the light guide 110. In other embodiments (also not illustrated), the diffraction grating 130 may be located within the light guide 110; that is, the diffraction grating 130 may be located between the first and second surfaces 110', 110" of the light guide) to provide diffractive coupling out of the guided time-multiplexed light beam portion.

Referring to FIG. 3B, an extended arrow (solid line) depicts or represents the guided light beam 104' propagating in the light guide 110 during the first time interval. Another extended arrow (dashed line) in FIG. 3B depicts the guided light beam 104" propagating in the light guide 110 during the second time interval. During the first time interval, the guided light beam 104' is illustrated as having the first non-zero propagation angle γ' and during the second time interval, the guided light beam 104" is illustrated as having the second non-zero propagation angle γ'. Further, both of the first and second time interval guided light beams 104', 104" are illustrated incident on the diffraction grating 130 from their respective different propagation angles γ', γ". Also illustrated in FIG. 3B is a first coupled-out light beam 102' (solid line) corresponding to the guided light beam 104' during the first time interval and a second coupled-out light beam 102" (dashed line) corresponding to the guided light beam 104" in the second time interval. The first coupled-out light beam 102' has a different principal angular direction than a principal angular direction of the second coupled-out light beam 102", as illustrated.

According to some embodiments, the diffraction grating 130 may comprise a multibeam diffraction grating 130. The multibeam diffraction grating 130 may be configured to diffractively couple out the portion of the guided light beam 104 as a plurality of coupled-out light beams 102 (e.g., as illustrated in FIG. 3A). Further, the coupled-out light beams 102 diffractively coupled out by the multibeam diffraction grating 130 have different principal angular directions from one another, according to various embodiments (e.g., also as illustrated in FIG. 3A). In particular, the multibeam diffraction grating 130 may be configured to provide a first plurality of coupled-out light beams 102 having a first set of different principal angular directions during the first time interval. Further, the multibeam diffraction grating 130 is configured to provide a second plurality of coupled-out light beams 102 having a second set of different principal angular directions during the second time interval.

FIG. 3A illustrates the first plurality of coupled-out light beams 102 comprising first coupled-out light beams 102' (solid lines) during the first time interval and the second plurality of coupled-out light beams 102 comprising second coupled-out light beams 102" (dashed lines) during the second time interval provided by the multibeam diffraction grating 130. Further, as illustrated in FIG. 3A, the coupled-out light beams 102', 102" of the first and second pluralities are angularly interleaved with one another, by way of example and not limitation. The first and second sets of different principal angular directions are a function, respectively, of the first and second non-zero propagation angles of the corresponding guided light beams 104' and 104", according to various embodiments.

Figure 5A:
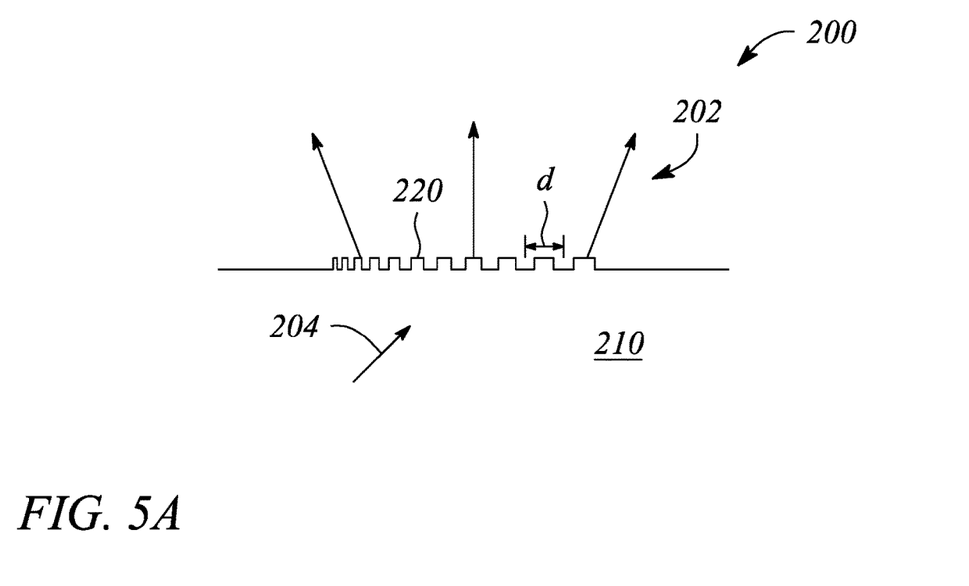
FIG. 5A illustrates a cross sectional view of a multibeam diffraction grating in an example, according to an embodiment consistent with the principles described herein.
Figure 5B:
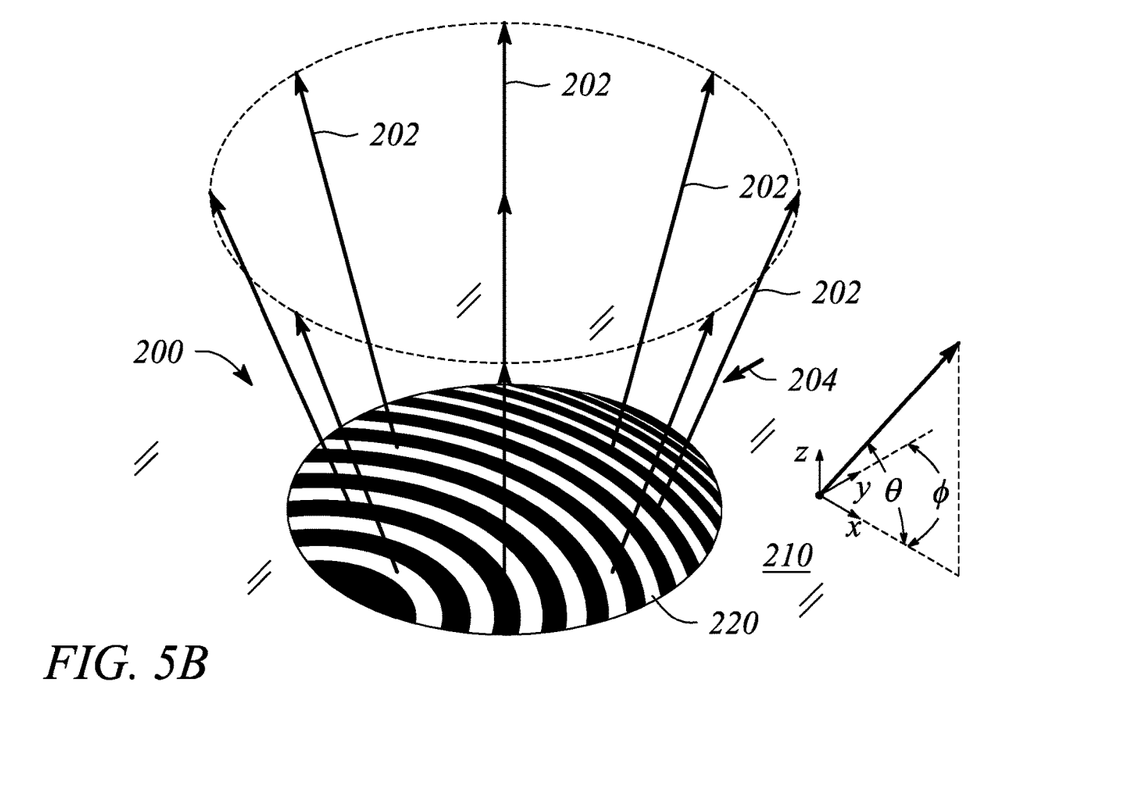
FIG. 5B illustrates a perspective view of a multibeam diffraction grating in an example, according to an embodiment consistent with the principles described herein.

FIG. 5A illustrates a cross sectional view of a multibeam diffraction grating 200 in an example, according to an embodiment consistent with the principles described herein. FIG. 5B illustrates a perspective view of a multibeam diffraction grating 200 in an example, according to an embodiment consistent with the principles described herein. The multibeam diffraction grating 200 illustrated in FIGS. 5A-5B may represent the diffraction grating 130 of FIGS. 3A and 3B, for example. In particular, the illustrated multibeam diffraction grating 200 may be optically coupled to a light guide 210 with an incident guided time-multiplexed light beam 204, as illustrated. The light guide 210 and an incident guided time-multiplexed light beam 204 may be substantially similar to the light guide 110 and the guided light beam 104, for example.

Further, as illustrated, the multibeam diffraction grating 200 may be configured to diffractively couple out a portion of the guided time-multiplexed light beam 204 provided by a time-multiplexed light source (e.g., the time-multiplexed light source 120) as a plurality of coupled-out light beams 202 directed away from the multibeam diffraction grating 200, as illustrated in FIGS. 5A-5B. The plurality of coupled-out light beams 202 may be substantially similar to the plurality of coupled-out light beams 102, described above for example. In particular, a coupled-out light beam 202 of the plurality may have principal angular direction that differs from principal angular directions of other coupled-out light beams 202 of the plurality.

According to various embodiments, the multibeam diffraction grating 200 illustrated in FIGS. 5A-5B comprises a plurality of diffractive features 220 that may represent one or both of grooves and ridges spaced apart from one another, for example. Further, each of the coupled-out light beams 202 of the plurality may have a different principal angular direction determined by characteristics of the diffractive features 220 of the multibeam diffraction grating 200, according to various embodiments. Moreover, according to various embodiments, the different principal angular directions of the coupled-out light beams 202 may correspond to different view directions of a multiview display, for example.

In particular, the diffractive features 220 of the multibeam diffraction grating 200 are configured to provide diffraction. The provided diffraction is responsible for the diffractive coupling of the portion of the guided time-multiplexed light beam 204 out of the light guide 210. According to some embodiments, the multibeam diffraction grating 200 may be or comprise a chirped diffraction grating. By definition, the 'chirped' diffraction grating is a diffraction grating exhibiting or having a diffraction spacing d of or between the diffractive features (i.e., a diffraction pitch) that varies across an extent or length of the chirped diffraction grating, e.g., as illustrated in FIGS. 5A-5B (and also in FIG. 3A, for example). Herein, the varying diffraction spacing d is defined and referred to as a 'chirp'. As a result of the chirp, the portion of the guided time-multiplexed light beam that is diffractively coupled out propagates away from the chirped diffraction grating at different diffraction angles corresponding to different points of origin across the chirped diffraction grating of the multibeam diffraction grating 200. By virtue of a predefined chirp, the chirped diffraction grating is responsible for the predetermined and different principal angular directions of the coupled-out light beams 202 of the light beam plurality.

In some examples, the chirped diffraction grating of the multibeam diffraction grating 200 may have or exhibit a chirp of the diffractive spacing d that varies linearly with distance. As such, the chirped diffraction grating is a 'linearly chirped' diffraction grating, by definition. FIGS. 5A-5B illustrate the multibeam diffraction grating 200 as a linearly chirped diffraction grating, by way of example and not limitation. In particular, as illustrated therein, the diffractive features 220 are closer together at a first end of the multibeam diffraction grating 200 than at a second end. Further, the diffractive spacing d of the illustrated diffractive features 220 varies linearly from the first end to the second end, as illustrated therein.

In another example (not illustrated), the chirped diffraction grating of the multibeam diffraction grating 200 may exhibit a non-linear chirp of the diffractive spacing. Various non-linear chirps that may be used to realize the multibeam diffraction grating 200 include, but are not limited to, an exponential chirp, a logarithmic chirp or a chirp that varies in another, substantially non-uniform or random but still monotonic manner. Non-monotonic chirps such as, but not limited to, a sinusoidal chirp or a triangle or sawtooth chirp, may also be employed. Combinations of any of these types of chirps may also be employed.

According to some embodiments, the multibeam diffraction grating 200 may comprise diffractive features 220 that are one or both of curved and chirped. For example, as illustrated in FIG. 5B, the multibeam diffraction grating 200 comprises diffractive features 220 that are both curved and chirped (i.e., the multibeam diffraction grating 200 in FIG. 5B is a curved, chirped diffraction grating). Further illustrated in FIG. 5B, the guided time-multiplexed light beam 204 is represented by a bold arrow pointing in an incident direction relative to the multibeam diffraction grating 200 at a first end of the multibeam diffraction grating 200. Also illustrated is the plurality of coupled-out light beams 202 represented by arrows pointing away from the light-incident side the multibeam diffraction grating 200. The coupled-out light beams 202 propagate away from the multibeam diffraction grating 200 in a plurality of different predetermined principal angular directions. In particular, the predetermined different principal angular directions of the coupled-out light beams 202 are different from one another in both azimuth and elevation, as illustrated therein. According to various examples, both the predefined chirp of the diffractive features 220 and the curve of the diffractive features 220 may be responsible for the different predetermined principal angular directions of the coupled-out light beams 202.

According to some embodiments of the principles described herein, a display (e.g., an electronic display) is provided. In various embodiments, the display is configured to emit modulated light beams as pixels of the display. A plurality of pixels, in turn, may represent or provide a view of the display. Further, in various examples, the emitted modulated light beams may be preferentially directed toward a viewing direction of the display. In some embodiments, the display is a multiview electronic display. Different ones of the modulated, differently directed light beams may correspond to different 'views' associated with the multiview electronic display, according to various examples. The different views may provide a 'glasses free' (e.g., autostereoscopic) representation of information being displayed by the multiview electronic display, for example.

Figure 6:
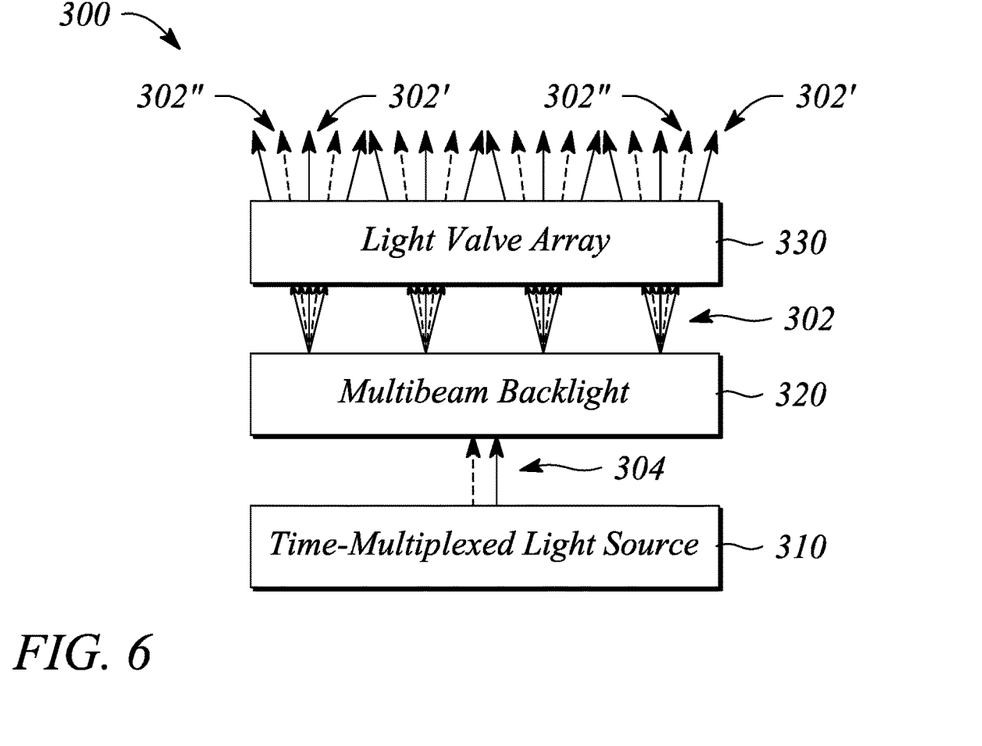
FIG. 6 illustrates a block diagram of a multiview display in an example, according to an embodiment consistent with the principles described herein.

FIG. 6 illustrates a block diagram of a multiview display 300 in an example, according to an embodiment consistent with the principles described herein. In various embodiments, the multiview display 300 may also be referred to as a multiview electronic display. As illustrated, the multiview display 300 is configured to emit light beams 302 representing pixels corresponding to different views associated with different view directions of the multiview display 300. Further, a plurality of emitted or 'coupled-out' light beams 302 may be emitted during a corresponding plurality of different time intervals. In particular, first emitted or coupled-out light beams 302' may be emitted during a first time interval, and second emitted or coupled-out light beams 302" may be emitted during a second time interval, according to various embodiments. In some embodiments, the emitted or coupled-out light beams 302 may be modulated emitted or coupled-out light beams 302, e.g., as described below.

As illustrated in FIG. 6, the multiview display 300 comprises a time-multiplexed light source 310. The time-multiplexed light source 310 is configured to provide a light beam having a first non-zero propagation angle during a first time interval and a second non-zero propagation angle during a second time interval. The first non-zero propagation angle is different the second non-zero propagation angle, according to various embodiments. The time-multiplexed light source 310 may be substantially similar to the time-multiplexed light source 120 described above with respect to the time-multiplexed backlight 100, in some embodiments.

For example, the time-multiplexed light source 310 may comprise a pair of time-multiplexed optical emitters. A first optical emitter of the pair may be configured to provide the light beam 304 at the first non-zero propagation angle during the first time interval (depicted as a solid-line arrow) and a second optical emitter of the pair being configured to provide the light beam 304 (depicted as a dashed-line arrow) at the second non-zero propagation angle during the second time interval. The time-multiplexed light source 310 may be substantially similar to the time-multiplexed light source 120 illustrated in above-described FIG. 4A, for example.

In another example, the time-multiplexed light source 310 may comprise a time-multiplexed collimator configured to provide the light beam as a collimated light beam. The time-multiplexed collimator has a first collimation state configured to provide the collimated light beam at the first non-zero propagation angle and a second collimation state configured to provide the collimator light beam at the second non-zero propagation angle. For example, the time-multiplexed light source 310 may be substantially similar to the time-multiplexed light source 120 illustrated in FIG. 4B, described above.

According to various embodiments, the multiview display 300 illustrated in FIG. 6 further comprises a multibeam backlight 320. The multibeam backlight 320 is configured to emit a portion of the light beam 304 from the time-multiplexed light source 310 as a first plurality of coupled-out light beams 302 (e.g., solid line arrows) during the first time interval and as a second plurality of coupled-out light beams 302 (e.g., dashed line arrows) during the second time interval, respectively. Further, according to various embodiments, the first and second coupled-out light beam pluralities have corresponding first and second sets of principal angular directions determined respectively by the first and second non-zero propagation angles of the light beam from the time-multiplexed light source 310. The principal angular directions are or correspond to view directions of different views of the multiview display, according to various embodiments. In some embodiments (e.g., as illustrated in FIG. 6), the coupled-out light beams 302 of the first and second pluralities of coupled-out light beams are angularly interleaved with one another. Similarly, the different views of the multiview display 300 in each of the first and second time intervals may be angularly interleaved, in some embodiments.

In some embodiments, the multibeam backlight 320 may comprise a plate light guide configured to guide the light beam 304 from the time-multiplexed light source 310. In particular, the light beam 304 may be guided at the first non-zero propagation angle during the first time interval and at the second non-zero propagation angle during a second time interval. Further, the time-multiplexed light source 310 may be optically coupled to an input of the plate light guide, according to various embodiments. According to some embodiments, the plate light guide may be substantially similar to the light guide 110 of the time-multiplexed backlight 100, described above.

For example, the plate light guide may be a slab optical waveguide that is a planar sheet of dielectric material configured to guide light by total internal reflection. The guided light beam 304 may be guided at either the first or second non-zero propagation angles as a beam of light. Thus, the guided light beam 304 guided by the plate light guide may be substantially similar to the guided light beam 104 of the time-multiplexed backlight 100. For example, the guided light beam 304 may be a collimated light beam, according to some embodiments.

In some embodiments, the multibeam backlight 320 may further comprise an array of multibeam diffraction gratings optically coupled to the plate light guide. According to various embodiments, a multibeam diffraction grating of the array may be configured to diffractively couple out a portion of the guided light beam 304 as the first plurality of coupled-out light beams 302 during the first time interval (e.g., solid line arrows) and as the second plurality of coupled-out light beams 302 during the second time interval (e.g., dashed line arrows). According to some embodiments, the multibeam diffraction grating of the array may be substantially similar to the multibeam diffraction grating 130 of the time-multiplexed backlight 100 as well as the multibeam diffraction grating 200 (FIGS. 5A-5B), described above. For example, a multibeam diffraction grating of the array of multibeam diffraction gratings may comprise a chirped diffraction grating or a chirped diffraction grating having curved diffractive features.

According to some embodiments (e.g., as illustrated in FIG. 6), the multiview display 300 may further comprise a light valve array 330. The light valve array 330 is configured to modulate the coupled-out light beams 302 of the first and second pluralities to produce respective modulated coupled-out light beams 302', 302". According to various embodiments, the modulated coupled-out light beams 302 represent pixels of the different views of the multiview display 300. In some embodiments, the different views are divided into a first set of views corresponding to the first time interval and a second set of views corresponding to the second time interval. Further, the view directions of the first and second sets of views may be angularly interleaved with one another, according to some embodiments. In various examples, different types of light valves in the light valve array 330 may be employed including, but not limited to, one or more of liquid crystal (LC) light valves, electrowetting light valves, and electrophoretic light valves. In FIG. 6, the arrows associated with modulated coupled-out light beams 302 with dashed lines depict modulated coupled-out light beams 302" of the second plurality and the arrows associated with modulated coupled-out light beams 302 with solid lines represent the modulated coupled-out light beams 302' of the first plurality.

In some embodiments, some coupled-out light beams 302 of the first and second pluralities may be configured to pass through the same light valves (not illustrated) of the light valve array 330. For example, a coupled-out light beam 302 of the first plurality and another coupled-out light beam 302 of the second plurality may be configured to pass through or 'share' the same light valve, even though the coupled-out light beams 302 have different principal angular directions. In such embodiments, the light valve may modulate the first plurality coupled-out light beam 302 during the first time interval differently from the second plurality coupled-out light beam 302. Such time-interval dependent modulation may facilitate time-multiplexed representation of different views of the multiview display 300, for example. Moreover, light valve sharing between coupled-out light beams 302 of the first and second pluralities may increase (e.g., substantially double) a resolution of the multiview display 300 for a given light valve resolution, according to some embodiments.

Figure 7:
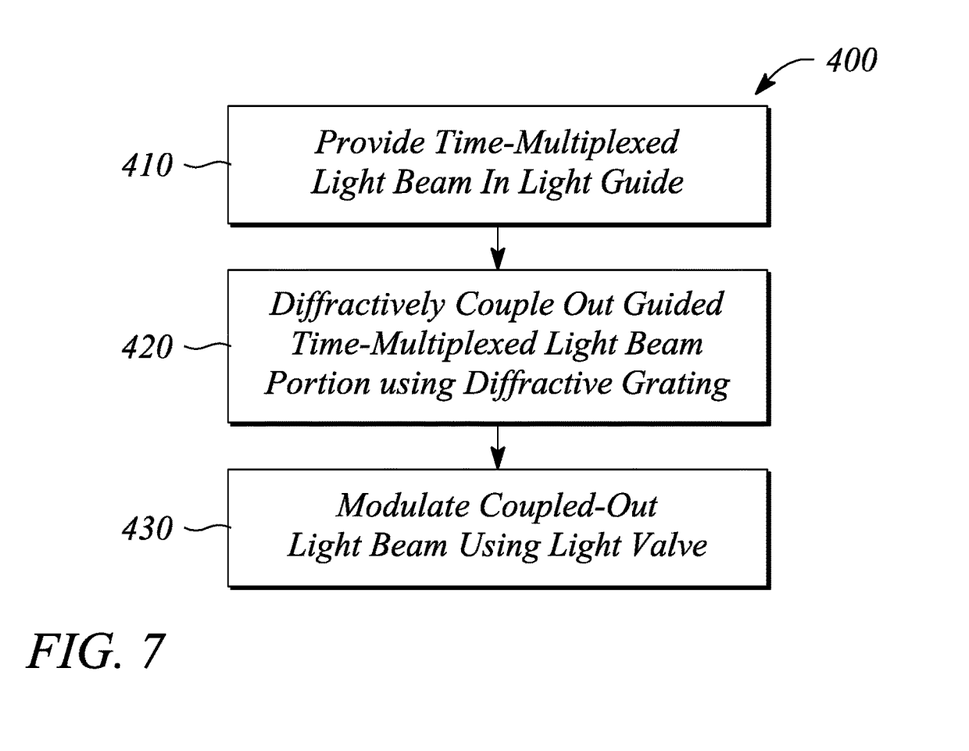
FIG. 7 illustrates a flow chart of a method of time-multiplexed backlight operation in an example, according to an embodiment consistent with the principles described herein.

According to some embodiments of the principles described herein, a method of time-multiplexed backlight operation is provided. FIG. 7 illustrates a flow chart of a method 400 of time-multiplexed backlight operation in an example, according to an embodiment consistent with the principles described herein. As is illustrated in FIG. 7, the method 400 of time-multiplexed backlight operation comprises providing 410 a time-multiplexed light beam in a light guide of a backlight where the provided 410 light beam is guided. Providing 410 a time-multiplexed light beam comprises introducing a first light beam into the light guide using a time-multiplexed light source to propagate at a first non-zero propagation angle during a first time interval; and introducing a second light beam into the light guide using the time-multiplexed light source to propagate at a second non-zero propagation angle during a second time interval. The first and second time intervals are different from one another. Moreover, the first and second non-zero propagation angles are different from one another.

In some embodiments, the time-multiplexed light beam may be provided 410 using a time-multiplexed light source substantially similar to the time-multiplexed light source 120 described above with respect to the time-multiplexed backlight 100, according to some embodiments. For example, the time-multiplexed light source may be implemented using a time-multiplexed optical emitters as illustrated in FIG. 4A or with a time-multiplexed collimator as illustrated in FIG. 4B. Further, the light guide and the guided time-multiplexed light beam may be substantially similar to the light guide 110 and the guided light beam 104, described above with respect to the time-multiplexed backlight 100. In particular, in some embodiments, the light guide may guide the guided light according to total internal reflection (e.g., as a collimated beam of light). Further, the provided 410 light beam may be guided at the first and second non-zero propagation angles between a first surface and a second surface of the light guide. The light guide may be a substantially planar dielectric optical waveguide (e.g., a plate light guide), in some embodiments.

The method 400 of time-multiplexed backlight operation further comprises diffractively coupling out 420 a portion of the guided time-multiplexed light beam as a coupled-out light beam using a diffraction grating. In particular, the portion is diffractively coupled out 420 during the first time interval and the second time interval using the diffraction grating. According to various embodiments, the coupled-out light beam is directed away from a surface of the light guide at time interval-based different predetermined principal angular directions. Further, the predetermined principal angular direction in each of the first time interval and the second time interval corresponds to a respective one of the first non-zero propagation angle and the second non-zero propagation angle of the guided time-multiplexed light beam, according to various embodiments.

In some embodiments, diffractively coupling out 420 a portion of the guided time-multiplexed light beam comprises using a diffraction grating, for example, a diffraction grating that is substantially similar to the diffraction grating 130 described above with respect to the time-multiplexed backlight 100. Further, the coupled-out light beam may be substantially similar to the coupled-out light beam 102 (i.e., light beams 102', 102"), also described above. In some embodiments, the diffraction grating may comprise a multibeam diffraction grating. The multibeam diffraction grating may be substantially similar to the multibeam diffraction grating 200 described above. In particular, the multibeam diffraction grating may be configured to diffractively couple out 420 the portion of the guided time-multiplexed light beam as a plurality of coupled-out light beams. The coupled-out light beams of the coupled-out light beam plurality may have different principal angular directions from one another, according to various embodiments. Also, the coupled-out light beams in the first time interval generally have different principal angular directions from the coupled-out light beams during the second time interval. Further, the different principal angular directions of the coupled-out light beams may correspond to respective view directions of different views of a multiview electronic display, in some embodiments.

In some embodiments (e.g., as illustrated in FIG. 7), the method 400 of time-multiplexed backlight operation further includes modulating 430 the coupled-out light beam using a light valve. The modulated 430 coupled-out light beam may form a pixel of an electronic display, according to various embodiments. In some embodiments (e.g., where a multibeam diffraction grating is used), modulating 430 the coupled-out light beam may provide modulation of a plurality of differently directed coupled-out light beams using a plurality of light valves. Moreover, the modulated 430 differently directed coupled-out light beams may be directed in different ones of various view directions of the multiview electronic display, for example. Further, the different views may comprise a first set of views during the first time interval and a second set of views in the second time interval, according to some embodiments. In addition, the first set of views may be angularly interleaved with the second set of views, in some embodiments.

The light valve used in modulating 430 the coupled-out light beam may be substantially similar to a light valve of the light valve array 330, according to some embodiments. For example, the light valve may include a liquid crystal light valve. In another example, the light valve may be another type of light valve including, but not limited to, one or both of an electrowetting light valve and an electrophoretic light valve, or combinations thereof with liquid crystal light valves or other light valve types.

Thus, there have been described examples of a time-multiplexed based backlight, a multiview display and a method of time-multiplexed backlight operation that employ time interval-based light at different non-zero propagation angles from a time-multiplexed light source. It should be understood that the above-described examples are merely illustrative of some of the many specific examples and embodiments that represent the principles described herein. Clearly, those skilled in the art can readily devise numerous other arrangements without departing from the scope as defined by the following claims.

What is claimed is:

1. A time-multiplexed backlight comprising:
a light guide configured to guide a beam of light as a guided light beam;
a time-multiplexed light source configured to provide to the light guide the light beam at a first non-zero propagation angle during a first time interval and at a second non-zero propagation angle during a second time interval; and
a plurality of diffraction gratings spaced apart from one another across the light guide and configured to diffractively couple out a portion of the guided light beam as coupled-out light beams having different principal angular directions in each of the first time interval and the second time interval, the different principal angular directions being provided by respective ones of the first non-zero propagation angle and the second non-zero propagation angle of the guided light beam, wherein the coupled-out light beams in the first time interval are interleaved with the coupled-out light beams in the second time interval, and wherein the plurality of diffraction gratings comprises a plurality of multibeam diffraction gratings, each multibeam diffraction grating of the plurality of multibeam diffraction gratings being configured to diffractively couple out the portion of the guided light as a plurality of coupled-out light beams having different principal angular directions from one another, wherein each of the multibeam diffraction gratings is configured to diffractively couple out a first plurality of coupled-out light beams having a first set of different principal angular directions in the first time interval and a second plurality of coupled-out light beams having a second set of different principal angular directions in the second time interval, the first set and the second set being different, the coupled-out light beams of the first plurality of coupled-out light beams being interleaved with coupled-out light beams of the second plurality of coupled-out light beams, the multibeam diffraction grating comprising one or both of a chirped diffraction grating and curved diffractive features adjacent to a surface of the light guide and comprising one of grooves and ridges that are spaced apart from one another at the light guide surface.

2. The time-multiplexed backlight of claim 1, wherein the first and second time intervals are non-overlapping intervals of time.

3. The time-multiplexed backlight of claim 1, wherein the time-multiplexed light source comprises a pair of time-multiplexed optical emitters, a first optical emitter of the pair being configured to provide the guided light beam at the first non-zero propagation angle and a second optical emitter of the pair being configured to provide the guided light beam at the second non-zero propagation angle, wherein switching between the first optical emitter and the second optical emitter as a function of time is configured to provide the guided light beam during respective first and second time intervals.

4. The time-multiplexed backlight of claim 1, wherein the time-multiplexed light source comprises an optical emitter configured to emit light and a time-multiplexed collimator configured to collimate the emitted light and to provide the collimated emitted light as the guided light beam, the time-multiplexed collimator having a first collimation state configured to provide the collimated emitted light at the first non-zero propagation angle during the first time interval and a second collimation state configured to provide the collimated emitted light at the second non-zero propagation angle during the second time interval.

5. The time-multiplexed backlight of claim 1, wherein the different principal angular directions of coupled-out light beams of the respective first and second pluralities of coupled-out light beams correspond to respective view directions of different views of a multiview electronic display.

6. A multiview electronic display comprising the time-multiplexed backlight of claim 1, the multiview electronic display further comprising an array of light valves configured to modulate the coupled-out light beams of the plurality of coupled-out light beams, wherein the principal angular directions of the first plurality of coupled-out light beams corresponds to a first set of view directions of the multiview electronic display, the principal angular directions of the second plurality of coupled-out light beams corresponding to a second set of view directions of the multiview electronic display, the modulated light beams representing pixels of the multiview electronic display in each of the first set of view directions and the second set of view directions respectively during the first time interval and the second time interval, wherein the pixels of the multiview electronic display during the first time interval are interleaved with pixels of the multiview electronic display during the second time interval.

7. An electronic display comprising the time-multiplexed backlight of claim 1, the electronic display further comprising an array of light valves configured to modulate the coupled-out light beams, the modulated light beams representing pixels of the electronic display, wherein pixels of the electronic display during the first time interval are interleaved with pixels of the electronic display during the second time interval.

8. A multiview display comprising:
a time-multiplexed light source configured to provide a light beam having a first non-zero propagation angle during a first time interval and a second non-zero propagation angle during a second time interval that is different from the first non-zero propagation angle; and
a multibeam backlight configured to emit a portion of the light beam as a first plurality of coupled-out light beams during the first time interval and as a second plurality of coupled-out light beams during the second time interval, the first plurality of coupled-out light beams having a first set of different principal angular directions, the second plurality of coupled-out light beams having a second set of different principal angular directions, the first set and the second set being different and being determined respectively by the different first and second non-zero propagation angles of the light beam,
wherein coupled-out light beams of the first plurality of coupled-out light beams are angularly interleaved with coupled-out light beams of the second plurality of coupled-out light beams, each of the first and second sets of different principal angular directions corresponding to view directions of different views of the multiview display, and
wherein the multibeam backlight comprises:
a plate light guide configured to guide the light beam at the first non-zero propagation angle during the first time interval and at the second non-zero propagation angle during a second time interval; and
an array of multibeam diffraction gratings optically coupled to and spaced apart across the plate light guide, each multibeam diffraction grating of the multibeam diffraction grating array being configured to diffractively couple out the portion of the light beam as the first plurality of coupled-out light beams during the first time interval and as the second plurality of coupled-out light beams during the second time interval,
wherein the time-multiplexed light source is optically coupled to an input of the plate light guide, and wherein a multibeam diffraction grating of the array of multibeam diffraction gratings comprises a chirped diffraction grating having curved diffractive features.

9. The multiview display of claim 8, wherein the time-multiplexed light source comprises a pair of time-multiplexed optical emitters, a first optical emitter of the pair being configured to provide the light beam at the first non-zero propagation angle during the first time interval, a second optical emitter of the pair being configured to provide the light beam at the second non-zero propagation angle during the second time interval.

10. The multiview display of claim 8, wherein the time-multiplexed light source comprises a time-multiplexed collimator configured to provide the light beam as a collimated light beam, the time-multiplexed collimator having a first collimation state configured to provide the collimated light beam at the first non-zero propagation angle and having a second collimation state configured to provide the collimated light beam at the second non-zero propagation angle.

11. The multiview display of claim 8, further comprising a light valve array configured to modulate the coupled-out light beams of the first and second pluralities of coupled-out light beams, the modulated coupled-out light beams representing pixels of the different views of the multiview display, wherein the different views are divided into a first set of views corresponding to the first time interval and a second set of views corresponding to the second time interval, view directions of the first and second sets of views being angularly interleaved with one another.

12. A method of time-multiplexed backlight operation, the method comprising:
providing a time-multiplexed light beam to be guided in a light guide at a first non-zero propagation angle during a first time interval and at a second non-zero propagation angle during a second time interval using a time-multiplexed light source; and
diffractively coupling out a portion of the guided time-multiplexed light beam as coupled-out light beams during the first time interval and the second time interval using a plurality of diffraction gratings, the coupled-out light beams being directed away from a surface of the light guide at time interval-based different predetermined principal angular directions,
wherein the predetermined principal angular directions of the coupled-out light beams in each of the first time interval and the second time interval are provided by a respective one of the first non-zero propagation angle and the second non-zero propagation angle of the guided time-multiplexed light beam, the coupled-out light beams diffractively coupled-out during the first time interval being interleaved with the coupled-out light beams diffractively coupled-out during the second time interval, and
wherein the plurality of diffraction gratings comprises a plurality of multibeam diffraction gratings, each multibeam diffraction grating of the plurality of multibeam diffraction gratings being configured to diffractively couple out the portion of the guided light as a plurality of coupled-out light beams having different principal angular directions from one another, wherein each of the multibeam diffraction gratings is configured to diffractively couple out a first plurality of coupled-out light beams having a first set of different principal angular directions in the first time interval and a second plurality of coupled-out light beams having a second set of different principal angular directions in the second time interval, the first set and the second set being different, the coupled-out light beams of the first plurality of coupled-out light beams being interleaved with coupled-out light beams of the second plurality of coupled-out light beams, the multibeam diffraction grating comprising one or both of a chirped diffraction grating and curved diffractive features adjacent to a surface of the light guide and comprising one of grooves and ridges that are spaced apart from one another at the light guide surface.

13. The method of time-multiplexed backlight operation of claim 12, wherein diffraction gratings of the plurality of diffraction gratings comprise multibeam diffraction gratings configured to diffractively couple out the portion of the guided time-multiplexed light beam as a plurality of coupled-out light beams during each of the first and second time intervals, the coupled-out light beams of the coupled-out light beam plurality having different principal angular directions corresponding to different view directions of different views of a multiview display.

14. The method of time-multiplexed backlight operation of claim 12, wherein the different principal angular directions of the respective coupled-out light beams correspond to respective view directions of different views of a multi-view electronic display, the different views comprising a first set of views during the first time interval that are interleaved with a second set of views in the second time interval.

15. The method of time-multiplexed backlight operation of claim 12, further comprising modulating the coupled-out light beams during the first time interval and the second time interval using an array of light valves, the modulated coupled-out light beams forming pixels of an electronic display, wherein pixels during the first time interval are interleaved with pixels during the second time interval.

* * * * *